(12) United States Patent
Zhou

(10) Patent No.: US 11,076,163 B2
(45) Date of Patent: Jul. 27, 2021

(54) METHOD AND SYSTEM FOR LOSSLESS CODING MODE IN VIDEO CODING

(71) Applicant: Texas Instruments Incorporated, Dallas, TX (US)

(72) Inventor: Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/120,846

(22) Filed: Dec. 14, 2020

(65) Prior Publication Data

US 2021/0105489 A1  Apr. 8, 2021

Related U.S. Application Data

(62) Division of application No. 13/623,087, filed on Sep. 19, 2012.

(Continued)

(51) Int. Cl.
| | |
|---|---|
| *H04N 19/167* | (2014.01) |
| *H04N 19/70* | (2014.01) |
| *H04N 19/61* | (2014.01) |
| *H04N 19/82* | (2014.01) |

(Continued)

(52) U.S. Cl.
CPC ......... *H04N 19/167* (2014.11); *H04N 19/103* (2014.11); *H04N 19/117* (2014.11); *H04N 19/172* (2014.11); *H04N 19/174* (2014.11); *H04N 19/176* (2014.11); *H04N 19/61* (2014.11); *H04N 19/70* (2014.11); *H04N 19/82* (2014.11); *H04N 19/12* (2014.11);

(Continued)

(58) Field of Classification Search
None
See application file for complete search history.

(56) References Cited

U.S. PATENT DOCUMENTS

| | | |
|---|---|---|
| 6,505,299 B1 | 1/2003 | Zeng |
| 7,395,345 B2 | 7/2008 | Fallon |
| | (Continued) | |

OTHER PUBLICATIONS

"TMS320DM6467 Digital Media System-on-Chip", SPRS403G, Texas Instruments Incorporated, Dec. 2007, revised Oct. 2010, pp. 1-355.

(Continued)

*Primary Examiner* — Christopher Braniff
(74) *Attorney, Agent, or Firm* — Ebby Abraham; Charles A. Brill; Frank D. Cimino

(57) ABSTRACT

A method for coding a video sequence is provided that includes encoding a portion of a picture in the video sequence in lossless coding mode, and signaling a lossless coding indicator in a compressed bit stream, wherein the lossless coding indicator corresponds to the portion of a picture and indicates whether or not the portion of the picture is losslessly coded. A method for decoding a compressed video bit stream is provided that includes determining that lossless coding mode is enabled, decoding a lossless coding indicator from the compressed video bit stream, wherein the lossless coding indicator corresponds to a portion of a picture in the compressed video bit stream and indicates whether or not the portion of the picture is losslessly coded, and decoding the portion of the picture in lossless coding mode when the lossless coding indicator indicates the portion of the picture is losslessly coded.

18 Claims, 5 Drawing Sheets

Related U.S. Application Data

(60) Provisional application No. 61/562,906, filed on Nov. 22, 2011, provisional application No. 61/554,144, filed on Nov. 1, 2011, provisional application No. 61/550,990, filed on Oct. 25, 2011, provisional application No. 61/539,156, filed on Sep. 26, 2011.

(51) Int. Cl.
| | |
|---|---|
| *H04N 19/103* | (2014.01) |
| *H04N 19/172* | (2014.01) |
| *H04N 19/117* | (2014.01) |
| *H04N 19/174* | (2014.01) |
| *H04N 19/176* | (2014.01) |
| *H04N 19/12* | (2014.01) |
| *H04N 19/157* | (2014.01) |
| *H04N 19/124* | (2014.01) |
| *H04N 19/436* | (2014.01) |

(52) U.S. Cl.
CPC .......... *H04N 19/124* (2014.11); *H04N 19/157* (2014.11); *H04N 19/436* (2014.11)

(56) References Cited

U.S. PATENT DOCUMENTS

| | | | |
|---|---|---|---|
| 10,257,520 | B2 | 4/2019 | He |
| 2005/0219069 | A1 | 10/2005 | Sato |
| 2007/0160305 | A1 | 7/2007 | Demos |
| 2007/0206679 | A1 | 9/2007 | Lim |
| 2008/0193032 | A1 | 8/2008 | Segall |
| 2008/0198935 | A1 | 8/2008 | Srinivasan |
| 2009/0161759 | A1 | 6/2009 | Seo |
| 2011/0150072 | A1 | 6/2011 | Han |
| 2011/0222608 | A1* | 9/2011 | Gao .................... H04N 19/96 375/240.24 |
| 2012/0236936 | A1 | 9/2012 | Segall et al. |
| 2013/0003838 | A1* | 1/2013 | Gao .................... H04N 19/61 375/240.12 |
| 2020/0195918 | A1 | 6/2020 | Hosokawa |

OTHER PUBLICATIONS

Benjamin Bross et al, "High Efficiency Video Coding (HEVC) Text Specification Draft 8", JCTVC-J1003_d7, Joint collaborative Team on Video Coding (JCT-VC) of ITU-T SG16 WP3 and ISO/IEC JTC1/SC291WG11, pp. 1-261, Jul. 11-20, 2012, Stockholm, Sweden.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

3ENJAMIN Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-229, Jul. 14-22, 2011, Torino, Italy.

Minhua Zhou, "AHG22: High-level Signaling of Lossless Coding Mode in HEVC", JCTVC-G092, Joint Collaborative Team on Video Coding (JCT-VC) of ITU-T SG16 WP3 and ISO/IEC JTC1/SC29/WG11, pp. 1-10, Nov. 19-30, 2011, Geneva, Switzerland.

Minhua Zhou, "AHG22: High-level Signaling of Lossless Coding Mode in HEVC", JCTVC-G092 Presentation, Joint Collaborative Team on Video Coding (JCT-VC) of ITU-T SG16 WP3 and ISO/IEC JTC1/SC29/WG11, pp. 1-4, Nov. 19-30, 2011, Geneva, Switzerland.

Benjamin Bross et al, "WD5: Working Draft 5 of high-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-237, Nov. 21-30, 2011 Geneva, Switzerland.

Bbenjamin Bross et all, "High Efficiency Video Coding (HEVC) Text Specification Draft 7", JCTVC-11003_d1, Joint collaborative Team on Video Coding (JCT-VC) of ITU-T SG16 WP3 and ISO/IEC JTC1/SC29/WG11, pp. 1-272, Apr. 27-May 7, 2012, Geneva, Switzerland.

Benjamin Bross et al, "High Efficiency Video Coding (HEVC) Text Specification Draft 6", JCTVC-H1003, Joint collaborative Team on Video Coding (JCT-VC) of ITU-T SG16 WP3 and ISO/IEC JTC1/SC29/WG11, pp. 1-259, Nov. 21-30, 2011, Geneva, Switzerland.

* cited by examiner

METHOD AND SYSTEM FOR LOSSLESS CODING MODE IN VIDEO CODING

CROSS-REFERENCE TO RELATED APPLICATIONS

This application is a division of U.S. patent application Ser. No. 13/623,087, filed Sep. 19, 2012, which claims benefit of U.S. Provisional Patent Application Ser. No. 61/539,156 filed Sep. 26, 2011, U.S. Provisional Patent Application Ser. No. 61/550,990 filed Oct. 25, 2011, U.S. Provisional Patent Application Ser. No. 61/554,144 filed Nov. 1, 2011, and U.S. Provisional Patent Application Ser. No. 61/562,906 filed Nov. 22, 2011, all of which are incorporated herein by reference in their entirety.

BACKGROUND OF THE INVENTION

Field of the Invention

Embodiments of the present invention generally relate to lossless coding mode in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and entropy coding of the transform coefficients.

The above compression process is inherently lossy. While the quantization of the transform coefficients compresses the video by taking advantage of perceptual redundancy in the video, it inevitably introduces quantization errors. In some real world applications, such lossy coding is undesirable. For example, in automotive vision applications, video captured from cameras in a vehicle may need to be transmitted to central processors in a lossless manner for purposes of applying video analytics. In another example, in web collaboration and remote desktop sharing applications where hybrid natural and syntactic video coding might be required, part of the video scene may contain synthetic contents such as presentation slides as well as graphical representation of function keys in a user interface that need to be losslessly coded.

Early HEVC specifications such as B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011, provide a mode for lossless coding referred to as pulse code modulation coding or I_PCM. In this mode, no prediction, transformation, quantization, or entropy coding is performed. Thus, there is no compression of the portions of a video stream coded in I_PCM mode.

SUMMARY

Embodiments of the present invention relate to methods, apparatus, and computer readable media for lossless coding in video coding. In one aspect, a method for coding a video sequence in a video encoder is provided that includes encoding a portion of a picture in the video sequence in lossless coding mode, and signaling a lossless coding indicator in a compressed bit stream, wherein the lossless coding indicator corresponds to the portion of a picture and indicates whether or not the portion of the picture is losslessly coded.

In one aspect, a method for decoding a compressed video bit stream in a video decoder is provided that includes determining that lossless coding mode is enabled for the compressed video bit stream, decoding a lossless coding indicator from the compressed video bit stream, wherein the lossless coding indicator corresponds to a portion of a picture in the compressed video bit stream and indicates whether or not the portion of the picture is losslessly coded, and decoding the portion of the picture in lossless coding mode when the lossless coding indicator indicates the portion of the picture is losslessly coded.

According to another embodiment of the present invention, a method of encoding video data is provided. The method comprising encoding a lossless encoding flag in a picture parameter set of a video sequence indicating regions of the video sequence may be losslessly encoded; dividing a picture using a quad-tree structure to form a plurality of logical coding units; encoding a coding unit lossless encoding flag for each coding unit of the picture parameter set indicating whether the coding unit is entirely losslessly encoded; encoding a portion of a picture for each coding unit in the picture, at least one coding unit in the picture encoded losslessly; and signaling the lossless encoding flag, the quad-tree structure, the coding unit lossless encoding flag; and the encoded portion of the picture for each coding unit.

According to another embodiment of the present invention, a method of decoding video data is provided. The method comprising: determining that lossless coding flag is enabled in a picture parameter set for the compressed video bit stream; decoding a coding unit lossless coding indicator from the compressed video bit stream, wherein the coding unit lossless coding indicator corresponds to a coding unit of quad-tree structure of a picture in the compressed video bit stream and indicates whether or not the coding unit is entirely losslessly coded; and decoding the coding unit in a lossless coding mode when the coding unit lossless coding indicator indicates the coding unit is losslessly coded.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
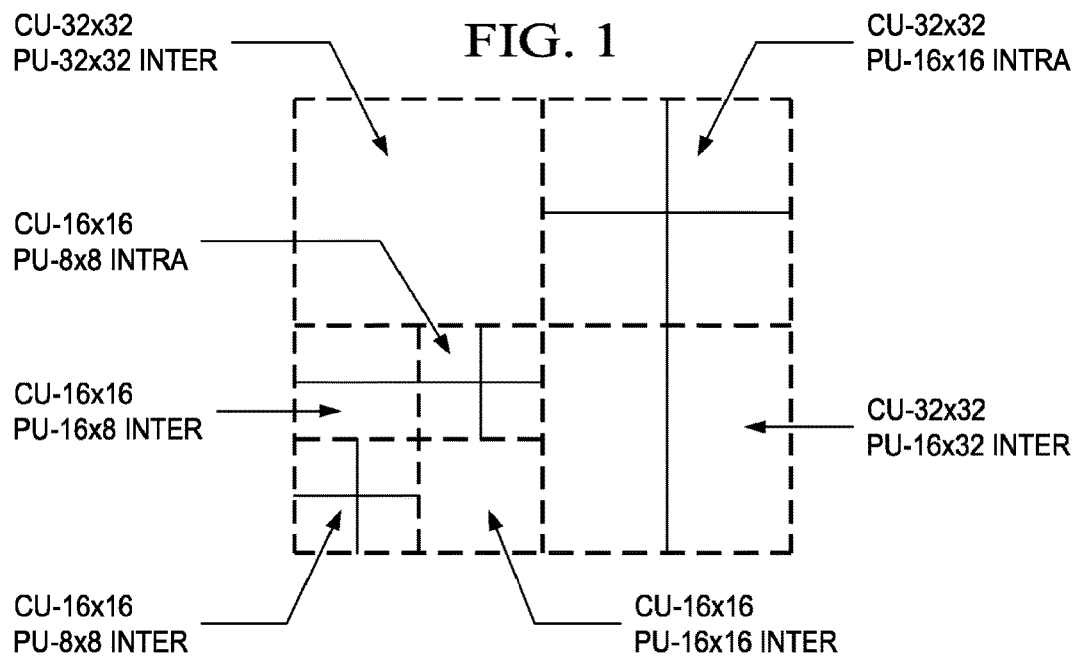
FIG. 1 is an example of quadtree based largest coding unit (LCU) decomposition.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by the video encoder during prediction based on minimization of rate/distortion costs. FIG. 1 shows an example of a quadtree based LCU to CU/PU decomposition structure in which the size of the SCU is 16×16 and the size of the LCU is 64×64.

Reference is made herein to a sequence parameter set (SPS), a picture parameter set (PPS), an adaptation parameter set (APS), and a slice header. An SPS is a set of parameters signaled at the beginning of a compressed bit stream that apply by default to the decoding of the entire compressed bit stream. A PPS is a set of parameters signaled in the compressed bit stream that apply to the decoding of one or more subsequent pictures. An APS is also a set of parameters signaled in the compressed bit stream that apply to the decoding of one or more subsequent pictures. An APS is used to code picture parameters that are likely to change from picture to picture while a PPS is used to code picture parameters that are unlikely to change from picture to picture. A slice is a sequence LCUs in a picture that may be decoded independently from LCUs in other slices in the picture. A slice header is a set of parameters signaled in the compressed stream that apply to a slice.

Reference is also made herein to LCU-aligned regions and coding block-aligned regions. An LCU-aligned region of a picture is a region in which the region boundaries are also LCU boundaries. It is recognized that the dimensions of a picture and the dimensions of an LCU may not allow a picture to be evenly divided into LCUs. There may be blocks at the bottom of the picture or the right side of the picture that are smaller than the actual LCU size, i.e., partial LCUs. These partial LCUs are mostly treated as if they were full LCUs and are referred to as LCUs. A coding block-aligned region of a picture is a region in which the region boundaries are also coding block boundaries. Coding blocks are explained in more detail herein.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), and B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8").

Some aspects of this disclosure have been presented to the JCT-VC in M. Zhou, "AHG22: High-Level Signaling of Lossless Coding Mode in HEVC," JCTVC-G092, Joint Collaborative Team on Video Coding (JCT-VC) of ITU-T SG16 WP3 and ISO/IEC JTC1/SC29/WG11, Geneva, CH, Nov. 19-30, 2011, which is incorporated by reference herein in its entirety.

As previously mentioned, HEVC as described in WD4 includes a lossless coding mode that does not provide any compression. To support the needs of real world applications having a need for lossless coding, lossless compression should be provided and lossless coding should be supported that: 1) allows an entire video sequence to be coded in lossless mode, e.g., for automotive vision; 2) allows a video sequence to be coded partially in lossless mode with the ability to switch between lossy and lossless coding at the picture level, e.g., for video conferencing and remote education; and 3) allows a picture to be coded partially in lossless mode, e.g., in video conferencing and remote education, part of a picture may include presentation slides and/or text that should be losslessly coded while the other parts may include natural video that may be lossy coded. Embodiments of the invention provide for a lossless coding mode that allows for compression. Further, embodiments provide for lossless coding at the sequence level, picture level, region level, LCU level, and/or sub-LCU level to support the above identified needs along with techniques for signaling lossless coding at these levels in the compressed bit stream.

As is explained in more detail herein, for lossless coding, the parts of the video encoding process that introduce loss, i.e., quantization, transformation, and in-loop filtering, are bypassed for those portions of a video sequence that are losslessly coded. Thus, when lossless coding mode is signaled to the decoder, the decoder will operate in a lossless decoding mode in which inverse quantization, inverse transformation, and in-loop filtering are bypassed for those same portions.

Example techniques for signaling lossless coding in a compressed video bit stream at the sequence, picture, region, LCU, and/or sub-LCU levels are first described from the perspective of a decoder. The particular symbolic names used herein for the various lossless coding parameters are for example purposes only. To inform a decoder whether or not lossless coding parameters are present in the compressed bit stream, i.e., whether or not lossless coding mode is to be enabled, a lossless coding enabled flag, lossless_coding_enabled_flag, is included in the sequence parameter set (SPS). If this flag is set, then lossless coding parameters may be present in the bit stream at various levels; otherwise, lossless coding parameters are not present in the bit stream.

To signal that an entire video sequence is encoded in lossless coding mode, a sequence lossless coding flag, sps_lossless_coding_enabled_flag, may be included in the SPS. If this flag is enabled, any lower level flags for lossless coding are not present in the bit stream, and the entire sequence is encoded in lossless mode. If this flag is disabled, lower level flags for lossless coding may present in the bit stream, and the sequence may partially encoded in lossless mode. If the flag is not present in the bit stream, it may be inferred equal to be disabled. Table 1 shows example pseudo code illustrating the syntax of the lossless coding enabled flag and sequence lossless coding flag at the sequence level.

TABLE 1

```
Seq_parameter_set_rbsp( ) {
  ... ...
    lossless_coding_enabled_flag
    If (lossless_coding_enabled_flag)
      sps_lossless_coding_enabled_flag
}
```

To signal that one or more consecutive pictures are entirely encoded in lossless mode, a picture lossless coding flag, pps_lossless_coding_enabled_flag, may be included in a PPS. If this flag is enabled, any lower level flags for lossless coding are not present in the bit stream, and the picture or pictures referring to the PPS are encoded entirely in lossless mode. If this flag is disabled, lower level flags for lossless coding may present in the bit stream, and the pictures may partially encoded in lossless mode. This flag may be used when lossless coding is enabled and the sequence lossless coding flag is not enabled. Table 2 shows example pseudo code illustrating the syntax of this flag.

TABLE 2

```
pic_parameter_set_rbsp( ) {
  ... ...
    If (lossless_coding_enabled_flag &&
    !sps_loss_coding_enabled_flag)
      pps_lossless_coding_enabled_flag
}
```

Sub-picture based lossless coding in the form of region based and LCU based lossless encoding may also be signaled. A picture may include one or more losslessly coded regions. The sizes of these regions may vary from picture to picture. Thus, the region based lossless coding is signaled for each picture that includes one or more losslessly coded regions. If the adaptive parameter set (APS) option is available, the region based lossless coding of a picture may be signaled in an APS for the picture. If the APS option is not available, the region based lossless coding of a picture may be signaled in a PPS for the picture. The region based lossless coding signaling examples provided herein assume that an APS option is available. One of ordinary skill in the art, having benefit of these examples, will understand embodiments in which the APS option is not available and the region based lossless coding is signaled instead in a PPS.

In some embodiments, a losslessly coded region is LCU-aligned. To signal that one or more LCU-aligned regions of a picture are encoded in lossless mode, a region lossless coding flag, aps_lossless_coding_enabled_flag, may be included in an APS followed by parameters that define the LCU-aligned regions that are losslessly encoded. The region definition parameters may include the number of losslessly coded regions in a picture, num_of_lossless_regions_minus1+1 and, for each region, parameters defining the boundaries of the region. For example, for a rectangular region, these parameters may be the horizontal and vertical LCU addresses of the upper-left corner of the region, region_upper_left_corner_x[i] and region_upper_left_corner_y[i], and the horizontal and vertical size (in LCUs) of the region, region_width_minus1[i]+1 and region_height_minus1[i]+1. The region lossless coding flag may be used when lossless coding is enabled and the picture lossless coding flag is not enabled in the PPS. The example pseudo code of Table 3 illustrates these APS parameters.

TABLE 3

```
adaptation_parameter_set_rbsp( ) {
  ... ...
  If (lossless_coding_enabled_flag) {
    f (!pps_lossless_coding_enabled_flag)
      aps_lossless_coding_enabled_flag
    if (aps_lossless_coding_enabled_flag) {
      num_of_lossless_regions_minus1
      for (i = 0; i < num_of_lossless_regions_minus1 + 1; i++) {
        region_upper_left_corner_x[i]
        region_upper_left_corner_y[i]
        region_width_minus1[i]
        region_height_minus1[i]
  } }}}
```

In some embodiments, the LCU-based lossless coding is at the LCU level, i.e., an entire LCU is either lossy or losslessly coded. To signal that one or more LCUs in a picture are encoded in lossless mode, a slice lossless coding flag, slice_lossless_coding_enabled_flag, may be included in a slice header. This flag allows switching between lossless and lossy coding from LCU to LCU. If this flag is enabled, a 1-bit coding flag is transmitted for each LCU to signal lossless or lossy coding for the LCU. In some embodiments, the LCU-level lossless coding flag may be transmitted immediately preceding entropy encoded residual values of the LCU. In some embodiments, the 1-bit coding flags for the LCUs may be grouped for a slice and transmitted following the slice header. The slice lossless coding flag may be used when the lossless coding is enabled and the region lossless coding flag is not enabled in the APS. The example pseudo code of Table 4 illustrates this parameter.

TABLE 4

```
slice_header( ) {
  If (lossless_coding_enabled_flag
  && !aps_lossless_coding_enabled_flag)
    slice_lossless_coding_enabled_flag
}
```

For some applications such as hybrid nature and syntactical video coding, signaling lossless coding down to the LCU level may not provide sufficient granularity. Accordingly, in some embodiments, the region based lossless coding is extended to allow the regions to be aligned based on a selected coding block size. Further, the LCU based lossless coding is extended to provide lossless coding at the sub-LCU level, i.e., lossless coding of blocks of a selected coding block size within an LCU.

TABLE 5

| lossless_coding_block_size_idc | Lossless coding block size |
|---|---|
| For LCU size 64 × 64 | |
| 0 | 64 × 64 |
| 1 | 32 × 32 |
| 2 | 16 × 16 |
| 3 | 8 × 8 |
| 4 | 4 × 4 |
| For LCU size 32 × 32 | |
| 0 | 32 × 32 |
| 1 | 16 × 16 |
| 2 | 8 × 8 |
| 3 | 4 × 4 |
| For LCU size 16 × 16 | |
| 0 | 16 × 16 |
| 1 | 8 × 8 |
| 2 | 4 × 4 |

Accordingly, in some embodiments, to signal that one or more coding block-aligned regions of a picture are losslessly encoded, the region lossless coding flag, aps_lossless_coding_enabled_flag, may be included in an APS followed by a lossless coding block size indicator and parameters that define the coding block-aligned regions that are losslessly encoded. The region definition parameters may include the number of losslessly coded regions in a picture, num_of_lossless_regions_minus1+1 and, for each region, parameters defining the boundaries of the region. For example, for a rectangular region, these parameters may be the horizontal and vertical coding block addresses of the upper-left corner of the region, region_upper_left_corner_x[i] and region_upper_left_corner_y[i], and the horizontal and vertical size (in coding blocks) of the region, region_width_minus1[i]+1 and region_height_minus1[i]+1. The region lossless coding flag may be used when lossless coding is enabled and the picture lossless coding flag is not enabled in the PPS. The example pseudo code of Table 6 illustrates these APS parameters.

TABLE 6

```
adaptation_parameter_set_rbsp( ) {
    ... ...
    If (lossless_coding_enabled_flag) {
        f (!pps_lossless_coding_flag)
            aps_lossless_coding_flag
        if (aps_lossless_coding_flag) {
            num_of_lossless_regions_minus1
            lossless_coding_block_size_idc
            for (i = 0; i < num_of_lossless_regions_minus1 + 1; i++) {
                region_upper_left_corner_x[i]
                region_upper_left_corner_y[i]
                region_width_minus1[i]
                region_height_minus1[i]
            }}}
```

Also, in some embodiments, to signal that one or more LCUs in a picture are encoded at least partially in lossless mode, the slice lossless coding flag, slice_lossless_coding_enabled_flag, may be included in a slice header. If this flag is enabled, a lossless coding block size indicator is transmitted in slice header to signal the lossless coding block size, and, as is explained in more detail below, quadtree based signaling is used to signal lossless or lossy coding of each coding block. The slice lossless coding flag may be used when lossless coding is enabled and the region lossless coding flag is not enabled in the APS. The example pseudo code of Table 7 illustrates these parameters.

TABLE 7

```
Slice_header( ) {
    If (lossless_coding_enabled_flag && !aps_lossless_coding_flag)
        slice_lossless_coding_flag
    If (slice_lossless_coding_flag)
        loss_coding_block_size_idc
}
```

The signaling of which coding blocks of an LCU are lossy coded and which are losslessly coded is quad-tree based. In some embodiments, a quadtree is explicitly signaled for each LCU that is separate from the quadtree signaling of the CU partitioning of the LCU. That is, split flags are transmitted for each LCU to indicate a recursive quadtree partitioning of the LCU with a lower bound of the coding block size. The quadtree partitioning indicated by the split flags identifies sub-blocks of the LCU that are either entirely lossy coded or entirely losslessly coded. In addition, for each sub-block of the indicated partitioning, 1-bit coding flags are transmitted. The 1-bit coding flag indicates whether or not the sub-block is entirely lossy coded or entirely losslessly coded. The split flags and the 1-bit coding flags for each LCU may be transmitted on an LCU by LCU basis, i.e., the split flags and 1-bit coding flags for each LCU precede the coded LCU data in the bit stream.

Figure 2:
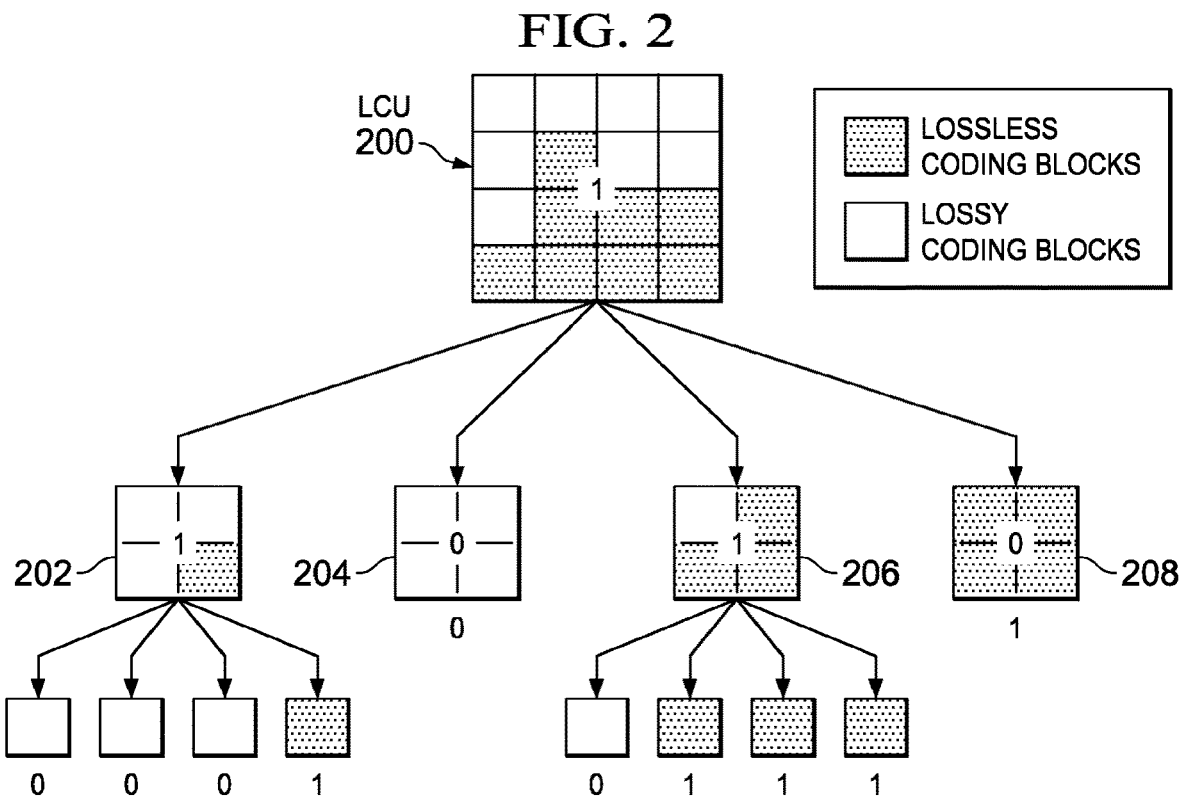
FIG. 2 is an example of quadtree based lossless coding signaling at the LCU level.

This signaling is explained by way of the example of FIG. 2. In this example, an LCU 200 is divided into 16 coding blocks of the size determined by the coding block size indicator and the shaded coding blocks are losslessly coded blocks. As there are both lossless and lossy coded coding blocks in the LCU 200, a split flag set to indicate that the LCU is to be split into four sub-blocks 202, 204, 206, 208 is transmitted. For purposes of this example, a split flag with a value of 1 indicates splitting and that the corresponding block is coded with in mixed lossy and lossless mode, and a split flag with a value of 0 indicates no splitting and that the corresponding block is entirely coded in lossless mode or lossy mode.

In FIG. 2, the split flag values for each sub-block are shown in the middle of the sub-block. Sub-blocks 202 and 206 include both lossy and losslessly coded coding blocks, so split flags with a value of 1 are transmitted to indicate that these sub-blocks are to be further divided. The sub-blocks resulting from this further partitioning are coding blocks, so no further splitting is needed and no split flags need to be transmitted for this lowest level partitioning. Sub-block 204 include only coding blocks that are lossy coded and sub-block 208 includes only coding blocks that are losslessly coded, so split flags with a value of 0 are transmitted to indicate that these sub-blocks are not to be further divided. Thus, for this example, the split flag sequence is 1 1 0 1 0. A series of 1-bit coding flags for the leaf nodes of the quad-tree are also transmitted to indicate whether the leaf blocks are lossy or losslessly coded. For purposes of this example, a coding flag value of 1 indicates lossless coding and a coding flag value of 0 indicates lossy coding. In the example of FIG. 2, the transmitted coding flags are 0 0 0 1 0 0 1 1 1 1.

The split flags and 1-bit coding flags may be transmitted sequentially such that the split flag sequence is followed by the coding flag sequence. Alternatively, the split flags and the 1-bit coding flags may be interleaved in the compressed bit stream. For example, one 1-bit coding flag can be transmitted immediately after a 0-value split flag, or four 1-bit flags can be transmitted immediately after a 1-value split flag when the sub-block size is the lossless coding block size. In the example of FIG. 2, for the sequential signaling format of split flags followed by 1-bit coding flags, the transmitted sequence would be (1 1 0 1 0) (0 0 0 1, 0, 0 1 1 1, 1); for the interleaved signaling format, transmitted sequence would be 1 1 (0 0 0 1) 0 (0) 1 (0 1 1 1) 0 (1)).

In some embodiments, rather than signaling a separate quadtree for indicating lossless and lossy coding at the sub-LCU level, the LCU to CU partitioning quadtree determined for each LCU is also used for lossless/lossy signaling. In such embodiments, the minimum lossless coding block size (see Table 5) that may be used is restricted to be equal to the size of the smallest coding unit (SCU) and the partitioning of an LCU into CUs is done such that each CU in the final quadtree partitioning of the LCU is either entirely lossy coded or entirely losslessly coded. Thus, the lossless coding block size is not explicitly signaled in the bit stream. Further, in such embodiments, the 1-bit coding flags are interleaved with CU data on a CU by CU basis, i.e., a 1-bit coding flag for each CU is transmitted in the bit stream immediately preceding the corresponding CU.

Figure 3:
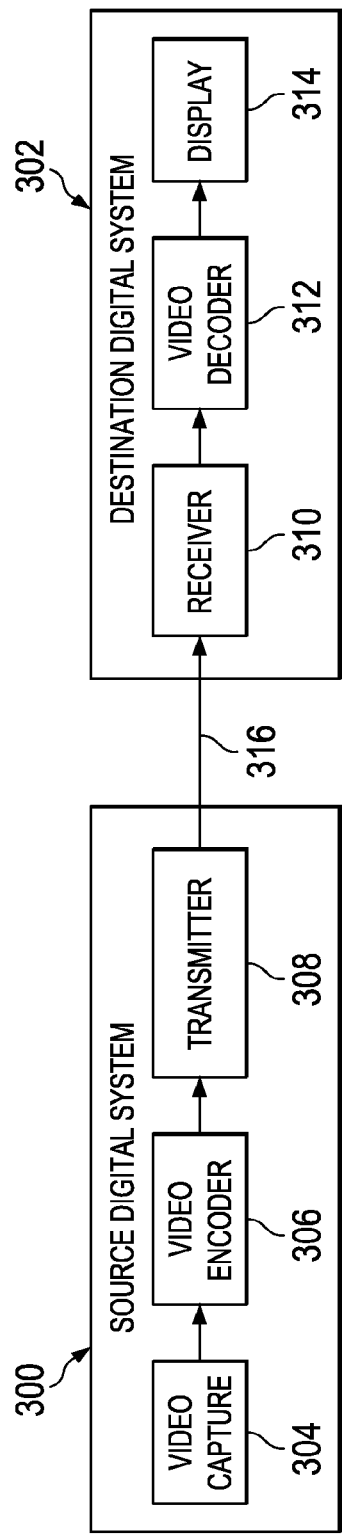
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to perform lossless coding of video data in the video sequence at various levels and signaling of lossless coding mode in the encoded video data during the encoding process as described herein. An embodiment of the video encoder component 306 is described in more detail herein in reference to FIGS. 4A and 4B.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to perform decoding according to signaling of lossless coding at various levels in the encoded video data from the encoder as described herein. An embodiment of the video decoder component 312 is described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4A:
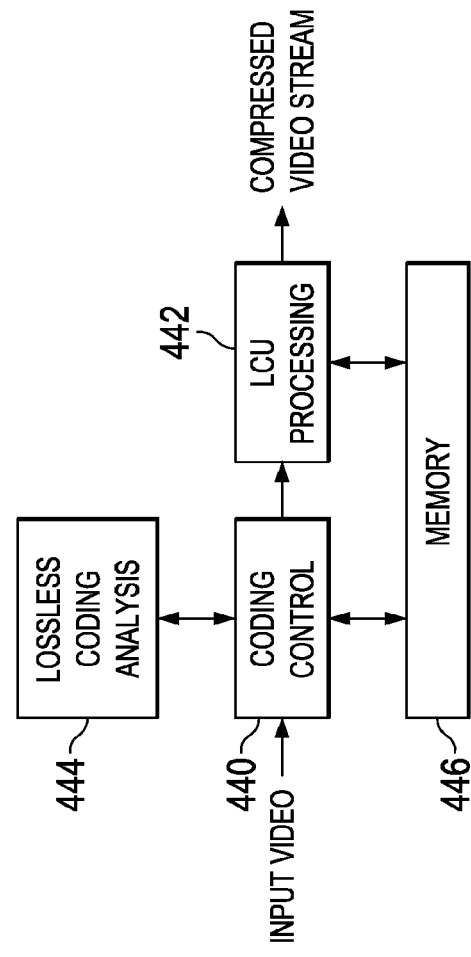
FIGS. 4A and 4B are block diagrams of a video encoder.
Figure 4B:
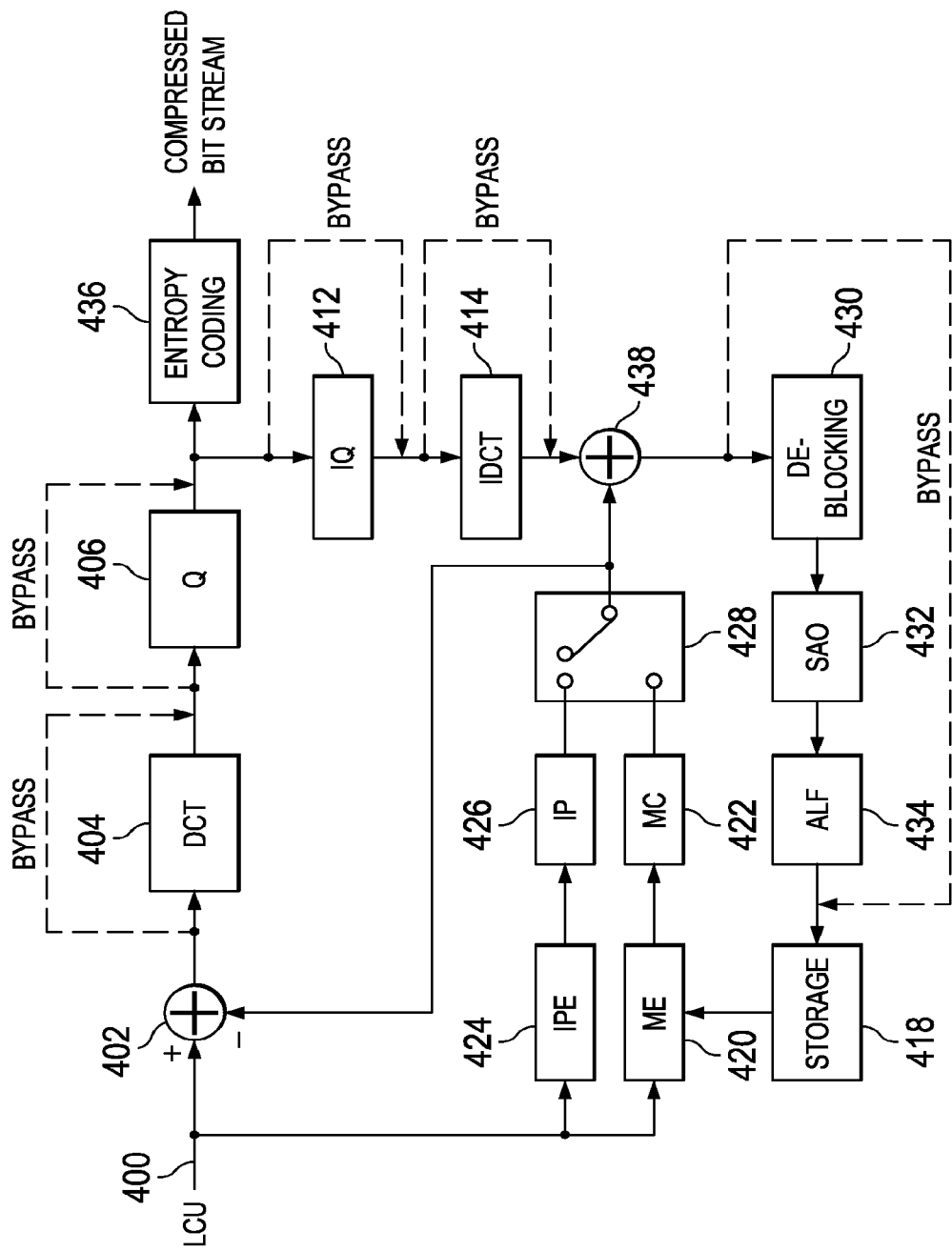
Figure 5:
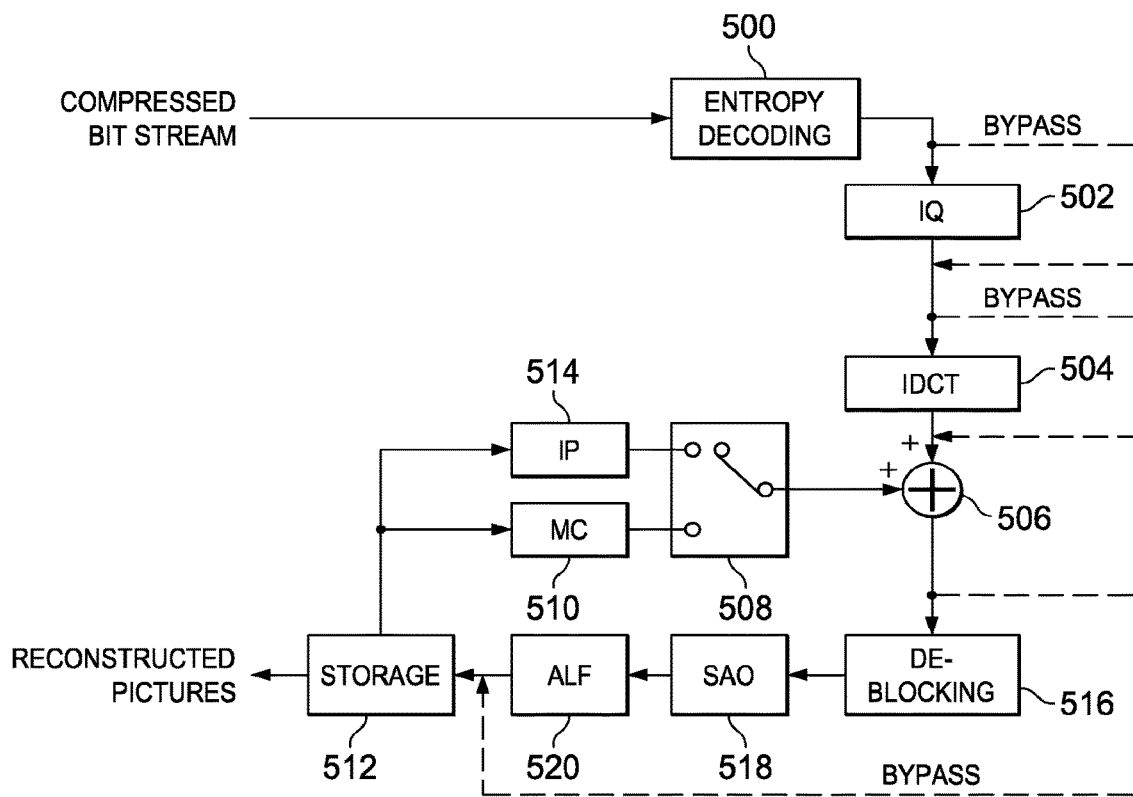
FIG. 5 is a block diagram of a video decoder.

FIGS. 4A and 4B show block diagrams of an example video encoder providing both lossless and lossy coding of video sequences and signaling of lossless coding in a compressed bit stream as previously described. FIG. 5 shows a block diagram of an example video decoder providing decoding of video sequences that are lossy encoded, losslessly encoded, or a combination thereof. Further, the video decoder is configured to recognize signaling of lossless coding in a compressed bit stream as previously described. For simplicity and consistency of explanation, the descriptions of the example video encoder and the example video decoder below assume that the APS option is available and assume the previously described example signaling. One of ordinary skill in the art will understand that other suitable signaling may be used that conveys the lossless coding levels and other information needed. Further, one of ordinary skill in the art, having benefit of this description, will understand embodiments in which the APS option is not available.

Referring now to the example video encoder of FIGS. 4A and 4B, lossless coding mode may be an option that is enabled at the application level, e.g., if the video encoder is deployed in an application that needs lossless coding. The enablement of lossless coding mode may be signaled in the SPS of a compressed video stream as previously described. Some embodiments of the video encoder may provide lossless coding at the sequence level, which may be signaled in the compressed bit stream in the SPS as previously described. Lossless coding at the sequence level may be an option that is enabled at the application level. Some embodiments may provide lossless coding at the picture level, which may be signaled in a PPS as previously described. Some embodiments may provide lossless coding at the LCU aligned region level and at the LCU level, which may be signaled, respectively, in an APS (or PPS) and slice header as previously described. Some embodiments may provide lossless coding at the coding block aligned region level and at the coding block level within LCUs, which may be signaled as previously described.

FIG. 4A shows a high level block diagram of the video encoder and FIG. 4B shows a block diagram of the LCU processing component 442 of the video encoder. As shown in FIG. 4A, the video encoder includes a coding control component 440, an LCU processing component 442, a lossless coding analysis component 444, and a memory 446. The memory 446 may be internal memory, external memory, or a combination thereof. The memory may be used to communicate information between the various components of the video encoder.

An input digital video sequence is provided to the coding control component 440. The coding control component 440 sequences the various operations of the video encoder, i.e., the coding control component 440 runs the main control loop for video encoding. For example, the coding control component 440 performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component 440 controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

When lossless coding is enabled at the sub-sequence level, the lossless coding analysis component 444 determines what parts of a picture should be losslessly encoded (which may be the entire picture) and provides this information to the coding control component 440 for communication to various components of the LCU processing component 442 as needed. The lossless coding analysis component 444 may use any suitable technique for determining the portions of the picture that should be losslessly encoded. For example, for a video conferencing application, the lossless coding analysis component 444 may use a region of interest algorithm designed to determine those parts of the picture that correspond to synthetic contents, e.g., presentation slides, which should be losslessly encoded.

The lossless coding analysis component 444 may also determine what level of lossless coding should be used for losslessly encoding the identified parts of the picture. The lossless coding analysis component 444 may use any suitable technique/criteria for determining which level of lossless coding would be best. For example, if the parts of the picture that are to be losslessly encoded cover a sufficiently large portion of the picture, the lossless coding analysis may specify that the entire picture is to be losslessly encoded. In some embodiments, the lossless coding analysis component 444 may specify that one or more LCU-aligned regions in a picture should be losslessly encoded or may specify which LCUs in a picture are to be losslessly encoded on an LCU by LCU basis.

In some embodiments, the lossless coding analysis component 444 may specify that one or more coding block-aligned regions in a picture should be losslessly encoded or may specify that one or more coding blocks within an LCU should be lossless encoded on an LCU by LCU basis. In such embodiments, to determine the lossless coding level, the lossless coding analysis component 444 may divide the picture into coding blocks of the sizes indicated in Table 5 to find the best coverage of the areas to be losslessly coded. In some such embodiments, if signaling on an LCU by LCU basis is selected, the lossless coding analysis component 444 may also determine the quadtree based signaling (previously described herein) of which coding blocks in an LCU are lossy coded and which are losslessly coded.

In some such embodiments, to better align coding blocks with the potential CU partitioning of LCUs in a picture, the lower limit on the coding block sizes (see Table 5) considered by the lossless coding analysis component 444 may be the smallest coding unit (SCU) size. As is described in more detail below, in such embodiments, there is no need for the lossless coding analysis component 444 to determine separate quadtree based signaling of lossless/lossy coding of coding blocks if signaling on an LCU by LCU basis is selected. Instead, as is explained in more detail below, the LCU to CU partitioning of an LCU determined during the encoding process is used for signaling of lossy/lossless coding of CUs.

When lossless coding mode is enabled, the coding control component 440 communicates the results of the analysis performed by the lossless coding analysis component 444 to various components of the LCU processing component 442 as needed. For example, when lossless coding mode is enabled, the coding control component 440 may communicate to the entropy coding component 436 (see FIG. 4B) that a lossless coding enabled flag indicating that lossless coding mode is enabled is to be included in the SPS of the video sequence. Similarly, if the entire video sequence is to be losslessly encoded, the coding control component 440 may communicate to the entropy coding component 436 that a sequence lossless coding flag indicating that the entire sequence is losslessly coded is to be included in the SPS of the video sequence. The coding control component 440 may also set flags in memory 446 to indicate these conditions to the various components of the LCU processing component 442.

If the lossless coding analysis component 444 indicates that an entire picture is to be losslessly coded, the coding control component 440 may communicate to the entropy coding component 436 that a picture lossless coding flag indicating that the entire picture is losslessly coded is to be included in a PPS for that picture. The coding control component 440 may also communicate this condition via memory 446 to the various components of the LCU processing component 442. For example, the coding control component 440 may maintain a coding bit map in memory 446 that may be used to indicate to the LCU processing component 440 on an LCU by LCU basis whether an LCU is to be lossy or losslessly coded. If an entire picture is to be losslessly coded, all bits in the map would be set to indicate lossless coding.

In embodiments in which the lossless coding analysis component 444 may specify that one or more LCU-aligned regions in a picture should be losslessly encoded or may specify which LCUs in a picture are to be losslessly encoded on an LCU by LCU basis, the coding control component 440 may communicate to the entropy coding component 436 that the previously described parameters for these conditions are to be included in, respectively, an APS for the picture or slice header(s) within that picture. The coding control component 440 may also communicate this information via memory 446 to the various components of the LCU processing component 442. For example, the coding control component 440 may set the previously mentioned coding bit map to indicate the LCUs that are to be losslessly coded.

In embodiments in which the lossless coding analysis component 444 may specify that one or more coding block-aligned regions in a picture should be losslessly encoded or may specify which coding blocks in an LCU are to be losslessly encoded on an LCU by LCU basis, the coding control component 440 may communicate to the entropy coding component 436 that the previously described parameters for these conditions are to be included in, respectively, an APS for the picture or slice header(s) within that picture. The coding control component 440 may also communicate this information via memory 446 to the various components of the LCU processing component 442. For example, the coding control component 440 may set the previously mentioned coding bit map to indicate which LCUs contain coding blocks to be losslessly coded and which are to be lossy coded. The coding control component 440 may also have LCU level coding bit maps to indicate which coding blocks within an LCU are to be losslessly coded and which are to be lossy coded.

In embodiments in which the LCU to CU partitioning of an LCU determined during encoding is to be used to signal lossy/lossless coding status, the coding control component 440 may communicate to the entropy coding component 436 (after the LCU to CU partitioning is determined) the 1-bit flags for signaling the lossy/lossless coding status of each CU that are to be interleaved with the CUs in the bit stream.

FIG. 4B shows a block diagram of the LCU processing component 442. The LCU processing receives LCUs 400 of the input video sequence from the coding control component 440 and encodes the LCUs 400 under the control of the coding control component to generate the compressed video stream. The LCUs 400 in each picture are processed in row order. The LCU processing component 442 is configured such that the components that introduce coding loss may be bypassed as needed to provide lossless coding at the level indicated by the coding control component 440. More specifically, as indicated in FIG. 4B, the transform component (DCT) 404 and the quantize component (Q) 406 may be bypassed. Further, the inverse quantize component (IQ) 412 and the inverse transform component 414 (IDCT) may be bypassed as transformation and quantization are not performed. In addition, the in-loop filtering components 430, 432, 434 may be bypassed as the filtering is performed to compensate for artifacts introduced by lossy coding and may also introduce additional coding errors.

The LCUs 400 from the coding control component 440 are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component 440 is provided to a mode decision component 428 and the entropy coding component 436.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), PU sizes, and TU sizes using reference picture data from storage 418 to choose the best CU partitioning, PU/TU partitioning, inter-prediction modes, motion vectors, etc. based on, e.g., a rate distortion coding cost. To perform the tests, the motion estimation component 420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

When the coding control component 440 indicates that a portion of an LCU is to be losslessly encoded, e.g., for coding block-aligned regions or coding blocks specified on an LCU by LCU basis, the CU/PU/TU decomposition of an LCU by the motion estimation component 420 includes consideration of the coding blocks that are to be losslessly coded. More specifically, when a coding block-aligned region falls partially within an LCU or if a separate quadtree is signaled for indicating lossless or lossy coding of coding blocks in an LCU, a CU can be coded partially in lossless mode and partially in lossy mode. That is, a CU may include both lossy coded coding blocks and losslessly coded coding blocks. In such embodiments, because transformation and quantization is bypassed for lossless coded parts of a CU and is performed for lossy coded parts, the motion estimation component 420 restricts the TU partitioning of a CU such that the lossless coding area inside the CU is a multiple of a TU.

For example, if an 8×8 area inside a 16×16 CU is to be losslessly coded, the TU size for the CU is restricted to be 8×8 or smaller. In another example, in a 64×64 LCU, the lossless coding analysis component 444 (see FIG. 4A) may indicate that the bottom right 8×8 block of the LCU is to be losslessly coded. The motion estimation component 420 may decide to partition this LCU into four 32×32 CUs such that the bottom right CU includes the 8×8 block to be losslessly coded and the other parts of the CU are to be lossy coded. For the TU determination of the bottom right CU, the motion estimation component 420 will restrict the TU size to be 8×8.

In embodiments in which the LCU to CU partitioning quadtree for an LCU is also used for lossless/lossy signaling rather than having separate quadtrees, CUs in the final LCU to CU quadtree are not allowed to include both lossy and losslessly coded areas. As previously mentioned, if the LCU CU quadtree is also used to signal lossless/lossy coding, the minimum coding block is restricted to the SCU size. When the motion estimation component 420 is considering options for LCU to CU partitioning (which are limited by the SCU size), modifications to the partitioning are made based on cost and the lossless coding partitioning selected by the lossless coding analysis component 444. When an LCU or a CU of an LCU is split for testing, if any CU in the resulting split includes both lossy and losslessly coded coding blocks, the motion estimation component 420 forces a further partitioning of that CU (limited by SCU size) until a partitioning is reached in which each CU is either entirely lossy coded or entirely losslessly coded.

The motion compensation component (MC) 422 receives information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on a rate distortion coding cost. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs, and the corresponding TU sizes for the selected CU partitioning to the intra-prediction component (IP) 426. The coding costs of the intra-predicted CUs are also provided to the intra-prediction component 426.

When the coding control component 440 indicates that a portion of an LCU is to be losslessly encoded, e.g., for coding block-aligned regions or coding blocks specified on an LCU by LCU basis, the CU/PU/TU decomposition of an LCU by the intra-prediction estimation component 424 includes consideration of the coding blocks that are to be losslessly coded. More specifically, when a coding block-aligned region falls partially within an LCU or in embodiments in which a separate quadtree is signaled for indicating lossless or lossy coding of coding blocks, a CU can be coded partially in lossless mode and partially in lossy mode. That is, a CU may include both lossy coded coding blocks and losslessly coded coding blocks. In such embodiments, similar to the motion estimation component 420, the intra-prediction estimation component 424 restricts the TU partitioning of a CU such that the lossless coding area inside the CU is a multiple of a TU. For example, if an 8×8 area inside a 16×16 CU is to be losslessly coded, the TU size for the CU is restricted to be 8×8 or smaller. Since in most cases, the PU size is equal to the TU size for an intra-coded CU, the PU size for the CU is also restricted.

In embodiments in which the LCU to CU partitioning quadtree for an LCU is also used for lossless/lossy signaling rather than having separate quadtrees, the intra-prediction estimation component 424 operates in a similar fashion to that previously described for the motion estimation component 420 to force an LCU to CU partitioning in which each CU is either entirely lossy coded or entirely losslessly coded.

The intra-prediction component 426 (IP) receives intra-prediction information from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component 440. Based on the decision as to whether a CU is to be intra- or inter-coded, the intra-predicted PUs or inter-predicted PUs are selected. The selected CU/PU/TU partitioning with corresponding modes, motion vector(s), reference picture index (indices), and prediction direction(s) (if any) are provided to the entropy coding component 436.

The output of the mode decision component 428, i.e., the predicted PUs, is provided to a negative input of the combiner 402 and to the combiner 438. The associated transform unit size is also provided to the transform component 404. The combiner 402 subtracts a predicted PU from the original PU to provide residual PUs to the transform component 404 (if not bypassed). Each resulting residual PU is a set of pixel difference values that quantify differences between pixel values of the original PU and the predicted PU. The residual blocks of all the PUs of a CU form a residual CU block for further processing.

When lossless coding mode is not enabled, the transform component 404 performs block transforms on all residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component 440 and the transform sizes and provides the quantized transform coefficients to the entropy coding component 436 for coding in the bit stream.

When lossless coding mode is enabled, the transform component 404 and the quantization are bypassed for any residual CUs that are entirely losslessly coded, and the residual values are provided to the entropy coding component 436 for coding in the bit stream. If a residual CU includes coding blocks that are to be losslessly coded and coding blocks that are to be lossy coded, the transform component 404 applies transforms of the specified sizes to the areas of the residual CU corresponding to coding blocks that are to be lossy coded and does nothing to those areas of the residual CU that are to be losslessly coded. As previously mentioned, TU partitioning of a CU is restricted such that the lossless coding area is a multiple of a TU. Further, the quantize component 406 quantizes the transform coefficients for those areas that to be lossy coded and does nothing to the other area. The resulting transform coefficients and residual value for the CU are provided to the entropy coding component 436 for coding in the bit stream.

The entropy coding component 436 entropy encodes the relevant data, i.e., syntax elements, output by the various encoding components and the coding control component 440 to generate the compressed video bit stream. As is well known, syntax elements are defined by a coding standard and are encoded according to a syntactical order specified in the coding standard. This syntactical order specifies the order in which syntax elements should occur in a compressed video bit stream. In embodiments of the invention, the syntax elements and syntactical order of HEVC are used, augmented with syntax elements for lossless coding signaling at the different levels described herein. Among the syntax elements that are encoded are flags indicating the CU/PU/TU partitioning of an LCU, the prediction modes for the CUs, lossless coding flags and other parameters related to lossless coding, and the quantized transform coefficients (for lossy coding) and/or residual pixel values (for lossless coding) for the CUs. The entropy coding component 436 also codes relevant data such as ALF parameters, e.g., filter type, on/off flags, and filter coefficients, and SAO parameters, e.g., filter type, on/off flags, and offsets if these components are not bypassed.

The LCU processing component 442 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

When lossless coding mode is not enabled, the quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 438.

When lossless coding mode is enabled, the inverse quantize component 412 and the inverse transform component 414 are bypassed for any CUs that are entirely losslessly coded and these residual CUs are provided to the combiner 438. If a CU is partially lossy coded and partially losslessly coded, the inverse quantize component 412 performs inverse quantization on the quantized transform coefficients for the areas that are lossy coded and does nothing to the areas that are losslessly coded. Further, the inverse transform component 414 applies inverse transforms of the specified size to the transform coefficients for the areas that are lossy coded to reconstruct the residual values and does nothing to the areas that are losslessly coded. The resulting residual CU, which will contain both original residual values from the encoding process and reconstructed residual values, is provided to the combiner 438.

The combiner 438 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed lossy coded picture data to improve the quality of the reference picture data used for encoding/decoding of subsequent pictures. The in-loop filters may include a deblocking filter 430, a sample adaptive offset filter (SAO) 432, and an adaptive loop filter (ALF) 434. In some embodiments, the ALF 434 may not be present. In general, the deblocking filter 430 operates to smooth discontinuities at block boundaries, i.e., TU and CU block boundaries, in a reconstructed picture. In general, the SAO filter 432 determines the best offset values, i.e., band offset values or edge offset values, to be added to pixels of a reconstructed picture to compensate for intensity shift that may have occurred during the block based coding of the picture and applies the offset values to the reconstructed picture. In general, the ALF 434 implements an adaptive Wiener filtering technique to minimize distortion in the reconstructed picture as compared to the original picture.

The various in-loop filters may be applied on an LCU-by-LCU basis. When lossless coding is not enabled, the three in-loop filters may be applied sequentially as shown in FIG. 4B to each reconstructed LCU. That is, the deblocking filter 430 may be first applied to the lossy coded reconstructed data. Then, the SAO 432 may be applied to the deblocked reconstructed picture data, and the ALF 434 may be applied to the SAO filtered reconstructed picture data. The final filtered reference picture data is provided to the storage component 418.

When lossless coding mode is enabled, the in-loop filters 430, 432, 434 are bypassed for any reconstructed LCUs that were entirely losslessly coded, and these LCUs are provided to the storage component 418. If a reconstructed LCU was partially losslessly coded and partially lossy coded, the in-loop filters 430, 432, 434 may be applied to those parts of the reconstructed LCU that were lossy coded. For application of the deblocking filter 430 along boundary edges between lossy and losslessly coded blocks, samples on the lossy coded block side may be filtered while samples on the losslessly coded block side are not filtered. The deblocking filter process (i.e., filter on/off decision and strong/weak filtering) is unchanged.

Referring now to the example video decoder of FIG. 5, the video decoder is configured to bypass certain components, i.e., the inverse quantize component 502, the inverse transformation component 504, and the filtering components 516, 518, 520 based on a signaled level of lossless coding. The video decoder operates to reverse the encoding operations, i.e., entropy coding, quantization, transformation, and prediction, performed by the video encoder of FIG. 5 to regenerate the pictures of the original video sequence. In view of the above description of a video encoder, one of ordinary skill in the art will understand the functionality of components of the video decoder without need for detailed explanation.

The entropy decoding component 500 receives an entropy encoded (compressed) video bit stream and reverses the entropy coding to recover the encoded syntax elements, e.g., CU, PU, and TU structures of LCUs, quantized transform coefficients (for lossy coding) and/or residual pixel values (for lossless coding) for CUs, motion vectors, prediction modes, lossless coding parameters (if present), etc. The decoded syntax elements are passed to the various components of the decoder as needed. For example, decoded prediction modes are provided to the intra-prediction component (IP) 514 or motion compensation component (MC) 510. If the decoded prediction mode is an inter-prediction mode, the entropy decoder 500 reconstructs the motion vector(s) as needed and provides the motion vector(s) to the motion compensation component 510.

If the entropy decoding component 500 decodes a lossless coding enabled flag in the SPS of the bit stream that indicates that lossless coding mode is enabled and lossless coding parameters may be present in the bit stream, the entropy decoding component 500 manages the decoding of the encoded pictures in the bit stream according to the lossless coding parameters in the bit stream. If the sequence lossless coding flag is present in the SPS and enabled, the picture data for the entire sequence is residual pixel values rather than quantized transform coefficients. According, the entropy decoding component 500 causes the inverse quantize component 502 and the inverse transform component 504 to be bypassed for the entire sequence, providing the entropy decoded residual CUs directly to the addition component 506. The in-loop filtering components 516, 518, 520 are also bypassed for the entire sequence.

If the entropy decoding component 500 decodes a picture lossless coding flag in a PPS indicating that one or more subsequent pictures in the bit stream are losslessly coded, the picture data for the one or more pictures is residual pixel values. Accordingly, the entropy decoding component 500 causes the inverse quantize component 502 and the inverse transform component 504 to be bypassed for the one or more pictures, providing the entropy decoded residual CUs directly to the addition component 506. The in-loop filtering components 516, 518, 520 are also bypassed for the one or more pictures.

In some embodiments, LCU-aligned region based and LCU based lossless coding may be signaled in the bit stream. As previously described, LCU-aligned region based lossless coding may be signaled in an APS and LCU based lossless coding may be signaled in a slice header. If the entropy decoding component 500 decodes a region lossless coding flag in an APS indicating that one or more LCU-aligned regions in a picture in the bit stream are losslessly coded, the picture data for the picture includes residual pixel values for those LCUs in the designated regions and quantized transform coefficients for those LCUs not in the designated regions. Accordingly, the entropy decoding component 500 may use the region definition parameters in the APS to determine which LCUs are lossy coded and which are losslessly coded. For example, the entropy decoding component 500 may construct a coding bit map based on the region definition parameters that indicates on an LCU by LCU basis whether an LCU is lossy or losslessly encoded.

The entropy decoding component 500 causes the inverse quantize component 502 and the inverse transform component 504 to be bypassed for the losslessly coded LCUs, providing the entropy decoded residual CUs of those LCUs directly to the addition component 506. The in-loop filtering components 516, 518, 520 are also bypassed for these LCUs. For the lossy coded LCUs, the entropy decoding component 500 provides the entropy decoded quantized transform coefficients of the CUs to the inverse quantize component 502. Also, the in-loop filtering components 516, 518, 520 are not bypassed for these LCUs.

If the entropy decoding component 500 decodes a slice lossless coding flag in a slice header indicating that one or more LCUs in the slice are losslessly coded, the picture data in the slice includes residual pixel values for those LCUs that are losslessly coded and quantized transform coefficients for those LCUs that are lossy coded. Accordingly, the entropy decoding component 500 may check the 1-bit flag encoded for each LCU in the slice to determine which LCUs are lossy coded and which are losslessly coded. The entropy decoding component 500 causes the inverse quantize component 502 and the inverse transform component 504 to be bypassed for the losslessly coded LCUs, providing the entropy decoded residual CUs of those LCUs directly to the addition component 506. The filtering components 516, 518, 520 are also bypassed for these LCUs. For the lossy coded LCUs, the entropy decoding component 500 provides the entropy decoded quantized transform coefficients of the CUs to the inverse quantize component 502. Also, the in-loop filtering components 516, 518, 520 are not bypassed for these LCUs.

In some embodiments, coding block-aligned region based and coding block based sub-LCU lossless coding may be signaled in the bit stream. As previously described, coding block-aligned region based lossless coding may be signaled in an APS and coding block based sub-LCU lossless coding may be signaled in a slice header. If the entropy decoding component 500 decodes a region lossless coding flag in an APS indicating that one or more coding block-aligned regions in a picture in the bit stream are losslessly coded, the picture data for the picture includes residual pixel values for coding blocks in the designated regions and quantized transform coefficients for those coding blocks not in the designated regions. Accordingly, the entropy decoding component 500 may use the region definition parameters and the coding block size in the APS to determine which coding blocks are lossy coded and which are losslessly coded. For example, the entropy decoding component 500 may construct a coding bit map based on the region definition parameters and the coding block size that indicates on an LCU by LCU basis whether an LCU includes losslessly coded coding blocks. The entropy decoding component 500 may also construct LCU level coding bit maps based on the region definition parameters and the coding block size to indicate which coding blocks within an LCU are losslessly coding and which are not.

The entropy decoding component 500 causes the inverse quantize component 502 and the inverse transform component 504 to be bypassed for the losslessly coded CUs of an LCU, providing the entropy decoded residual CUs of those LCUs directly to the addition component 506. The filtering components 516, 518, 520 are also bypassed for these CUs. For the lossy coded CUs, the entropy decoding component 500 provides the entropy decoded quantized transform coefficients of the CUs to the inverse quantize component 502. Also, the in-loop filtering components 516, 518, 520 are not bypassed for these CUs.

For CUs of an LCU that are partially losslessly coded and partially lossy coded, the entropy decoding component 500 causes the inverse quantize component 502 and the inverse transform component 504 to be bypassed for the losslessly coded parts, providing the entropy decoded residual for those parts to the addition component 506. The in-loop filtering components 516, 518, 520 are also bypassed for the losslessly coded parts. For the lossy coded parts, the entropy decoding component 500 provides the entropy decoded quantized transform coefficients of these parts to the inverse quantize component 502.

In some embodiments, if the entropy decoding component 500 decodes a slice lossless coding flag in a slice header indicating that coding block based sub-LCU lossless coding is enabled, for each LCU in the slice, the entropy decoding component 500 uses the coding block size signaled in the slice header and the split flags and 1-bit coding flags signaled for the LCU to determine which coding blocks in an LCU are lossy coded and which are losslessly coded. The entropy decoding component 500 causes the inverse quantize component 502 and the inverse transform component 504 to be bypassed for the losslessly coded CUs of an LCU, providing the entropy decoded residual CUs directly to the addition component 506. The filtering components 516, 518, 520 are also bypassed for these CUs. For the lossy coded CUs, the entropy decoding component 500 provides the entropy decoded transform coefficients of the CUs to the inverse quantize component 502. Also, the filtering components 516, 518, 520 are not bypassed for these CUs.

For CUs of an LCU that are partially losslessly coded and partially lossy coded, the entropy decoding component 500 causes the inverse quantize component 502 and the inverse transform component 504 to be bypassed for the losslessly coded parts, providing the entropy decoded residual for those parts to the addition component 506. The in-loop filtering components 516, 518, 520 are also bypassed for the losslessly coded parts. For the lossy coded parts, the entropy decoding component 500 provides the entropy decoded quantized transform coefficients of these parts to the inverse quantize component 502.

In some embodiments, if the entropy decoding component 500 decodes a slice lossless coding flag in a slice header indicating that coding block based sub-LCU lossless coding is enabled, for each LCU in the slice, the entropy decoding component 500 uses the LCU to CU partitioning signaled for the LCU and the 1-bit coding flags signaled for each CU in the LCU to determine which CUs in the LCU are lossy coded and which are losslessly coded. The entropy decoding component 500 causes the inverse quantize component 502 and the inverse transform component 504 to be bypassed for the losslessly coded CUs of an LCU, providing the entropy decoded residual CUs directly to the addition component 506. The in-loop filtering components 516, 518, 520 are also bypassed for these CUs. For the lossy coded CUs, the entropy decoding component 500 provides the entropy decoded quantized transform coefficients of the CUs to the inverse quantize component 502. Also, the in-loop filtering components 516, 518, 520 are not bypassed for these CUs.

The inverse quantize component (IQ) 502 de-quantizes the quantized transform coefficients of fully or partially lossy coded CUs. The inverse transform component 504 transforms the frequency domain data from the inverse quantize component 502 back to the residual CUs. That is, the inverse transform component 504 applies an inverse unit transform, i.e., the inverse of the unit transform used for encoding, to the de-quantized residual coefficients to produce reconstructed residual values of the CUs.

A residual CU supplies one input of the addition component 506. The other input of the addition component 506 comes from the mode switch 508. When an inter-prediction mode is signaled in the encoded video stream, the mode switch 508 selects predicted PUs from the motion compensation component 510 and when an intra-prediction mode is signaled, the mode switch selects predicted PUs from the intra-prediction component 514.

The motion compensation component 510 receives reference data from the storage component 512 and applies the motion compensation computed by the encoder and transmitted in the encoded video bit stream to the reference data to generate a predicted PU. That is, the motion compensation component 510 uses the motion vector(s) from the entropy decoder 500 and the reference data to generate a predicted PU.

The intra-prediction component 514 receives reconstructed samples from previously reconstructed PUs of a current picture from the storage component 512 and performs the intra-prediction computed by the encoder as signaled by an intra-prediction mode transmitted in the encoded video bit stream using the reconstructed samples as needed to generate a predicted PU.

The addition component 506 generates a reconstructed CU by adding the predicted PUs selected by the mode switch 508 and the residual CU. The output of the addition component 506, i.e., the reconstructed CUs, is stored in the storage component 512 for use by the intra-prediction component 514.

In-loop filters may be applied to reconstructed lossy coded picture data to improve the quality of the decoded pictures and the quality of the reference picture data used for decoding of subsequent pictures. The in-loop filters are the same as those of the encoder, i.e., a deblocking filter 516, a sample adaptive offset filter (SAO) 518, and an adaptive loop filter (ALF) 520. In some embodiments, the ALF 520 may not be present. The in-loop filters may be applied on an LCU-by-LCU basis. When lossless coding mode is not enabled, the three in-loop filters may be applied sequentially as shown in FIG. 5 to each reconstructed LCU. That is, the deblocking filter 516 may be first applied to the lossy coded reconstructed data. Then, the SAO 518 may be applied to the deblocked reconstructed picture data, and the ALF 520 may be applied to the SAO filtered reconstructed picture data. The final filtered LCUs are stored in the storage component 512 and are output as part of the final decoded video sequence.

When lossless coding mode is enabled, the in-loop filters 516, 518, 520 are bypassed for any reconstructed LCUs that were entirely losslessly coded, and the unfiltered reconstructed LCUs are stored in the storage component 512 and are output as part of the final decoded video sequence. If a reconstructed LCU was partially losslessly coded and partially lossy coded, the in-loop filters 516, 518, 520 may be applied to those parts of the reconstructed LCU that were lossy coded. For application of the deblocking filter 516 along boundary edges between lossy and losslessly coded blocks, samples on the lossy coded block side may be filtered while samples on the losslessly coded block side are not filtered. The deblocking filter process (e.g., filter on/off decision and strong/weak filtering) is unchanged. The partially filtered reconstructed LCUs are also stored in the storage component 512 and are output as part of the final decoded video sequence.

Figure 6:
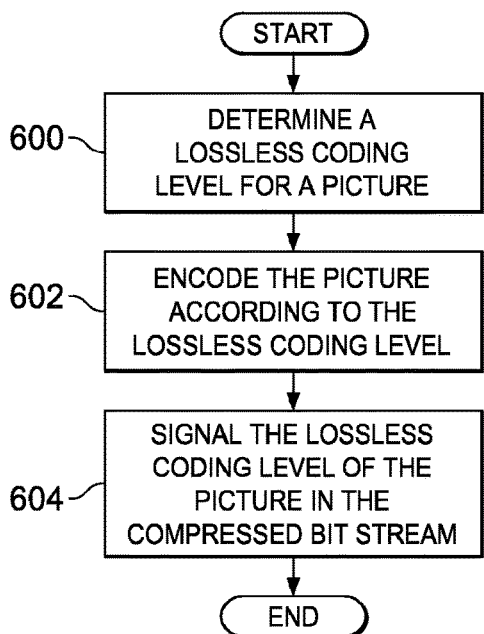
FIG. 6 is a flow diagram of an encoding method.

FIG. 6 is a flow diagram of an encoding method that may be performed in a video encoder, e.g., the encoder of FIGS. 4A and 4B. This method may be performed when lossless coding mode is enabled in the video encoder. Enabling of lossless coding mode in a video encoder is previously described herein. As shown in FIG. 6, initially a lossless coding level is determined 600 for a picture. In some embodiments, the lossless coding level may be the picture level, the LCU-aligned region level, or the LCU level. In some embodiments, the lossless coding level may be the picture level, the coding block-aligned region level, or the sub-LCU (coding block) level. These levels are previously described herein. This determination may be made in any suitable way. For example, a region of interest algorithm may be used to determine what part or parts of the picture should be encoded losslessly. A further analysis may be performed to determine which of the levels is most suitable for lossless encoding of the identified part(s).

The picture is then encoded 602 according to the selected lossless coding level. That is, the parts of the picture identified by the lossless coding level are encoded in lossless coding mode. Encoding of a picture according to the various levels is previously described herein.

The lossless coding level used in encoding the picture is also signaled 604 in the compressed bit stream. Signaling of the various lossless coding levels is previously described herein. The signaling may include lossless coding indicators that indicate whether or not portions of the picture are losslessly encoded. For example, a picture lossless coding flag indicates whether or not a picture is losslessly encoded. In another example, a region lossless coding flag indicates whether or not a region (or regions) in a picture is losslessly encoded. In another example, a 1-bit coding flag corresponding to a CU indicates whether or not a CU is losslessly encoded.

Figure 7:
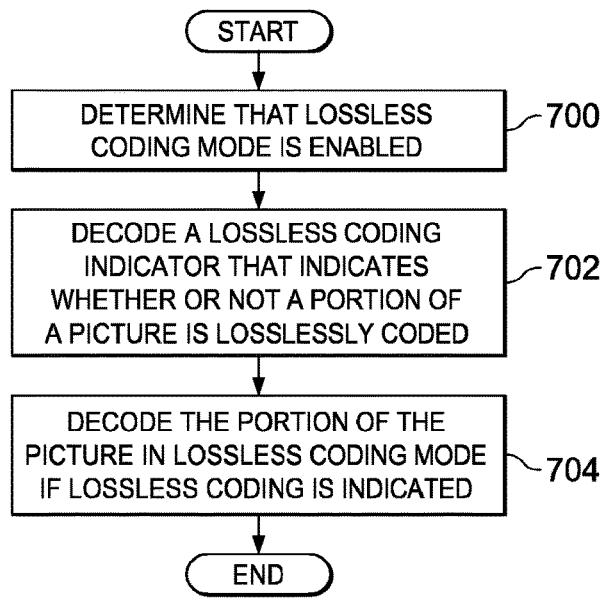
FIG. 7 is a flow diagram of a decoding method.

FIG. 7 is a flow diagram of a decoding method that may be performed in a video decoder, e.g., the decoder of FIG.

5. Initially, a determination 700 is made that lossless coding mode is enabled. As is previously described herein, this determination may be made based on the value of a lossless coding enabled flag encoded in the SPS of a compressed video bit stream.

A lossless coding indicator is decoded 702 that indicates whether or not a portion of a picture is losslessly coded. The portion of the picture may be the entire picture, a region of the picture, an LCU in the picture, a coding block in the picture, or a CU of an LCU in the picture. Such lossless coding indicators are previously described herein. The portion of the picture is then decoded 704 in lossless coding mode if the indicator is set to indicate lossless coding mode. Decoding in lossless coding mode is previously described herein.

Figure 8:
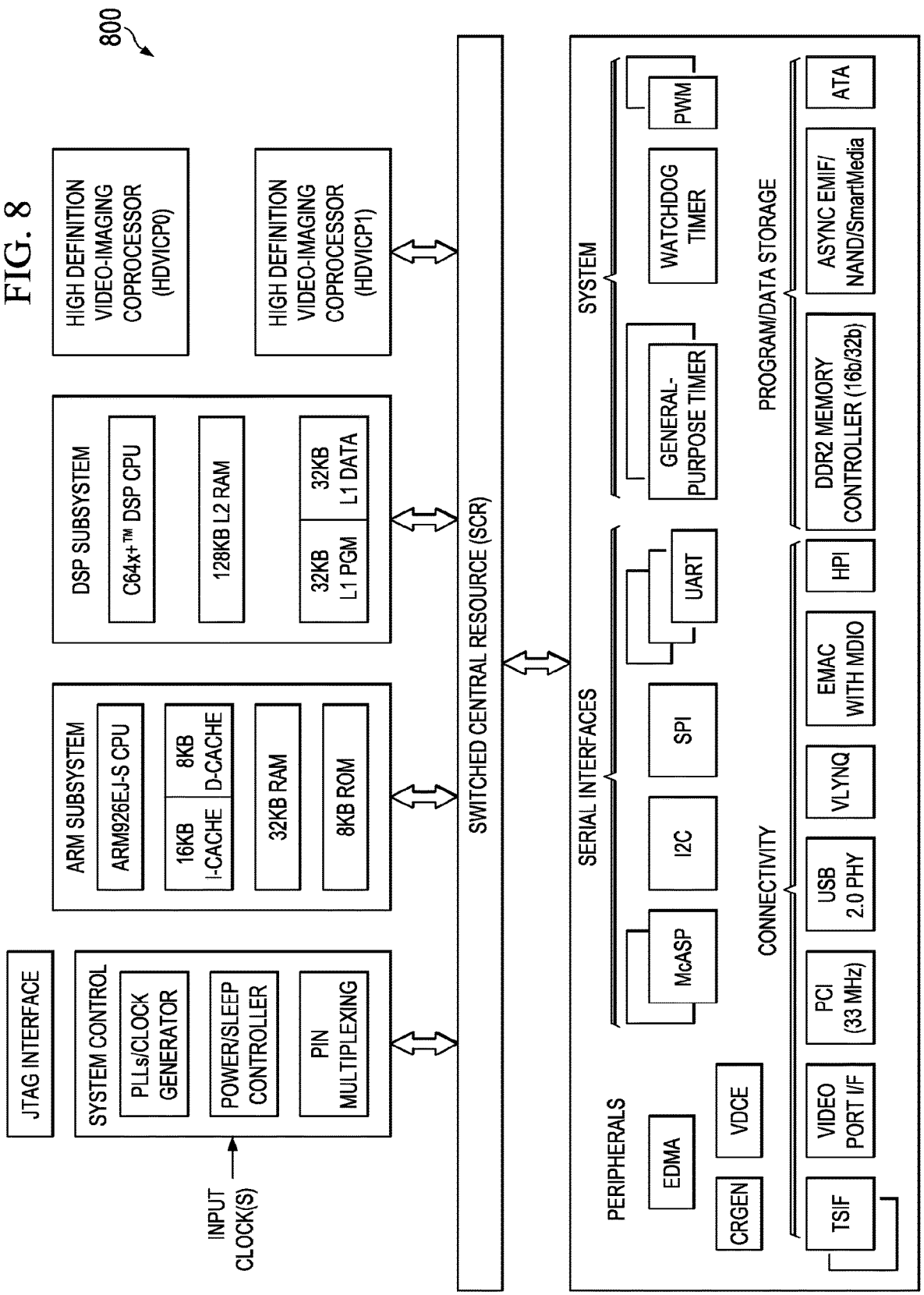
FIG. 8 is a block diagram of an illustrative digital system.

FIG. 8 is a block diagram of an example digital system suitable for use as an embedded system that may be configured to encode a video sequence using lossless coding techniques as described herein and/or to decode a compressed video bit stream generated using lossless coding techniques as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 800 is a programmable platform designed to meet the processing needs of applications such as video encode/decode/transcode/transrate, video surveillance, video conferencing, set-top box, medical imaging, media server, gaming, digital signage, etc. The SoC 800 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 800 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 800, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 800 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 8, the SoC 800 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, in some embodiments, a 1-bit lossless coding indicator can be signaled at the TU level instead of CU level. Also, in some embodiments, instead of having an explicit lossless coding indicator for a TU or a CU, a selected QP value associated with a CU or a TU can be used for lossless coding signaling when lossless coding is enabled at a higher level.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method, comprising:
    receiving a compressed bit stream comprising a picture, the picture comprising a coding unit;
    decoding, in a picture parameter set syntax of the compressed bitstream, a transform-and-quantization bypass enabled flag;
    following the decoding of the transform-and-quantization bypass enabled flag, decoding a transform-and-quantization bypass flag for the coding unit in the compressed bitstream only when the transform-and-quantization bypass enabled flag is set to indicate that the transform-and-quantization bypass flag is present; and
    bypassing a transform process and a quantization process for the coding unit when the transform-and-quantization bypass flag is set to indicate that the transform process and the quantization process for the coding unit are bypassed.

2. The method of claim 1, wherein the coding unit comprises a transform unit; and
    further comprising decoding a transform bypass flag only when transform-and-quantization bypass flag is not set to indicate that the transform process and the quantization process for the coding unit are bypassed.

3. The method of claim 1, wherein the transform-and-quantization bypass flag is associated with the coding unit.

4. The method of claim 1, wherein the transform-and-quantization bypass enabled flag is a 1-bit flag and the transform-and-quantization bypass flag is a 1-bit flag.

5. The method of claim 4, wherein:
    the transform-and-quantization bypass enabled flag is set to indicate that the transform-and-quantization bypass flag is present comprises the transform-and-quantization bypass enabled flag is set to a binary value of 1; and
    the transform-and-quantization bypass flag is set to indicate that the transform process and the quantization process for the coding unit are bypassed comprises the transform-and-quantization bypass flag is set to a binary value of 1.

6. The method of claim 1, further comprising bypassing an in-loop filter process for the coding unit when the transform-and-quantization bypass flag is set to indicate that the transform process and the quantization process for the coding unit are bypassed.

7. A system, comprising:
    a receiver configured to receive a compressed bit stream comprising a picture, the picture comprising a coding unit;
    a video decoder coupled to the receiver and configured to:
        decode, in a picture parameter set syntax of the compressed bitstream, a transform-and-quantization bypass enabled flag;
        following the decoding of the transform-and-quantization bypass enabled flag, decode a transform-and-quantization bypass flag for the coding unit in the compressed bitstream only when the transform-and-quantization bypass enabled flag is set to indicate that the transform-and-quantization bypass flag is present; and
        bypass a transform process and a quantization process for the coding unit when the transform-and-quantization bypass flag is set to indicate that the transform process and the quantization process for the coding unit are bypassed.

8. The system of claim 7, wherein the coding unit comprises a transform unit; and
    the video decoder is configured to decode a transform bypass flag only when transform-and-quantization bypass flag is not set to indicate that the transform process and the quantization process for the coding unit are bypassed.

9. The system of claim 7, wherein the transform-and-quantization bypass flag is associated with the coding unit.

10. The system of claim 7, wherein the transform-and-quantization bypass enabled flag is a 1-bit flag and the transform-and-quantization bypass flag is a 1-bit flag.

11. The system of claim 10, wherein:
    the transform-and-quantization bypass enabled flag is set to indicate that the transform-and-quantization bypass flag is present comprises the transform-and-quantization bypass enabled flag is set to a binary value of 1; and
    the transform-and-quantization bypass flag is set to indicate that the transform process and the quantization process for the coding unit are bypassed comprises the transform-and-quantization bypass flag is set to a binary value of 1.

12. The system of claim 7, wherein the video decoder is configured to bypass an in-loop filter process for the coding unit when the transform-and-quantization bypass flag is set to indicate that the transform process and the quantization process for the coding unit are bypassed.

13. A system, comprising:
    a receiver configured to receive a compressed bit stream comprising a picture, the picture comprising a coding unit;
    a video decoder coupled to the receiver and configured to:
        decode, in a picture parameter set syntax of the compressed bitstream, a transform-and-quantization bypass enabled flag;
        following the decoding of the transform-and-quantization bypass enabled flag, decode a transform-and-quantization bypass flag for the coding unit in the compressed bitstream only when the transform-and-quantization bypass enabled flag is set to indicate that the transform-and-quantization bypass flag is present; and
        bypass a transform process and a quantization process for the coding unit when the transform-and-quantization bypass flag is set to indicate that the transform process and the quantization process for the coding unit are bypassed; and
    a display component coupled to the video decoder and configured to display the coding unit.

14. The system of claim 13, wherein the coding unit comprises a transform unit; and
    the video decoder is configured to decode a transform bypass flag only when transform-and-quantization bypass flag is not set to indicate that the transform process and the quantization process for the coding unit are bypassed.

15. The system of claim 13, wherein the transform-and-quantization bypass flag is associated with the coding unit.

16. The system of claim 13, wherein the transform-and-quantization bypass enabled flag is a 1-bit flag and the transform-and-quantization bypass flag is a 1-bit flag.

17. The system of claim 16, wherein:

the transform-and-quantization bypass enabled flag is set to indicate that the transform-and-quantization bypass flag is present comprises the transform-and-quantization bypass enabled flag is set to a binary value of 1; and the transform-and-quantization bypass flag is set to indicate that the transform process and the quantization process for the coding unit are bypassed comprises the transform-and-quantization bypass flag is set to a binary value of 1.

18. The system of claim 13, the video decoder is configured to bypass an in-loop filter process for the coding unit when the transform-and-quantization bypass flag is set to indicate that the transform process and the quantization process for the coding unit are bypassed.

\* \* \* \* \*